United States Patent [19]

Shimoda

[11] Patent Number: 5,719,722
[45] Date of Patent: Feb. 17, 1998

[54] HEAD TRACKING SYSTEM FOR A MAGNETIC DISK DRIVE, AND HAVING AN ACTUATOR FOR POSITIONING THE READ/WRITE HEAD TO THE TARGET TRACK BASED ON TOTAL ERROR SIGNAL

[75] Inventor: Masamichi Shimoda, Tokyo, Japan

[73] Assignee: NEC Corporation, Japan

[21] Appl. No.: 570,085

[22] Filed: Dec. 11, 1995

[30] Foreign Application Priority Data

Dec. 14, 1994 [JP] Japan .................................. 6-310164

[51] Int. Cl.$^6$ .................................................. G11B 5/596
[52] U.S. Cl. ............................... 360/78.14; 360/77.07; 369/44.34
[58] Field of Search ....................... 360/77.01, 77.02, 360/77.07, 77.05, 77.08, 77.11, 78.14; 369/44.34; 318/560

[56] References Cited

U.S. PATENT DOCUMENTS

| | | | |
|---|---|---|---|
| 4,633,334 | 12/1986 | Miyazaki et al. | 360/77.02 X |
| 4,679,103 | 7/1987 | Workman | 360/77 |
| 4,794,469 | 12/1988 | Kaido et al. | 360/77.02 X |
| 4,933,785 | 6/1990 | Morehouse et al. | 360/77.02 X |
| 5,089,757 | 2/1992 | Wilson | 318/560 |
| 5,128,812 | 7/1992 | Uno | 360/78.06 |
| 5,132,854 | 7/1992 | Tsuyoshi et al. | 360/78.14 |
| 5,465,183 | 11/1995 | Hattori | 360/77.05 X |

FOREIGN PATENT DOCUMENTS

0320975  12/1988  European Pat. Off. .......... G11B 7/09

OTHER PUBLICATIONS

Hasegawa et al; "Fast Access Control of the Head Positioning Using a Digital Signal Processor";SPLE/SPSE Symposium on Electronic Imaging (Santa Clara Feb. 14, 1990).

Patent Abstract of Japan, vol. 13 No. 180, Jan. 13, 1989, Minoru "Head Position Controller for Disk Storage Device".

Patent Abstract of Japan vol. 9 No. 276, Jun. 29, 1985, Kazuharu et al. "Retrieving Device of Information Track".

*Primary Examiner*—Andrew L. Sniezek
*Attorney, Agent, or Firm*—Hayes, Soloway, Hennessey, Grossman & Hage, P.C.

[57] ABSTRACT

A head tracking system for a magnetic head includes a servo signal generator for generating a position error signal, a low-pass filter passing the position error signal, an A/D converter converting the position error signal into a digital position error signal, a signal processor for generating a total error signal based on the digital position error signal and the distance between the present track and the target track, and an actuator moving the magnetic head to the target track based on the total position error signal. The low-pass filter has a cut-off frequency equal to one-half the sampling frequency of the A/D converter. If the frequency of the position error signal is high, the output of the servo signal is supplied by a selector directly to the A/D converter thereby bypassing the low-pass filter. Alternatively, the cut-off frequency of the low-pass filter is controlled based on the frequency of the position error signal.

7 Claims, 2 Drawing Sheets

HEAD TRACKING SYSTEM FOR A MAGNETIC DISK DRIVE, AND HAVING AN ACTUATOR FOR POSITIONING THE READ/WRITE HEAD TO THE TARGET TRACK BASED ON TOTAL ERROR SIGNAL

BACKGROUND OF THE INVENTION (a) Field of the Invention

The present invention relates to a head tracking system for a disk drive and, more particularly, to a head tracking system for a disk drive executing a digital control for positioning of a read/write head.

(b) Description of the Related Art

Some magnetic disk drives include a head tracking system for a magnetic head. FIG. 1 shows a conventional magnetic head tracking system in a magnetic disk drive, in which a digital control scheme is employed for positioning of a magnetic head to a target track to be accessed by the magnetic head. The disk drive has a spindle motor 9 mounting thereon a plurality of recording disk files 8. A magnetic read/write head 7 is reciprocally moved in a radial direction of the recording disk file 8 by an actuator implemented by a drive motor or voice control motor 6. After the magnetic head 7 reads out a tracking signal 101 from servo information recorded on the disk file 8, a servo signal generator 1 generates an analog position error signal or servo signal 102 representing deviation of the radial position of the magnetic head 7 from the center of the present track over which the magnetic head 7 resides.

The analog servo signal 102 is then supplied to an analog-to-digital (A/D) converter 2, which generates a digital servo signal 103 based on the analog servo signal 102. The digital servo signal 103 is supplied to a microcomputer (MPU) 3, which calculates a digital total error signal 104 based on the digital servo signal 103 and a distance signal representing the distance between the target track and the present track. The present track is obtained based on track-crossing pulses supplied from another circuit portion in the system.

A digital-to-analog (D/A) converter 4 converts the digital total error signal 104 into an analog total error signal 105 and supplies the same to a power amplifier 5, which supplies a driving current 106 to the drive motor 6, thereby forming a feed-back loop to move the magnetic head 7 to the center of the target track. Both the A/D converter 2 and D/A converter 4 are controlled by a fixed frequency called sampling frequency when the former receives the digital servo signal 102 and the latter outputs the analog total error signal 105.

The conventional head tracking system as described above, however, does not provide a sufficient accuracy and a high-speed seeking requested by a disk file recording system in which the recording density thereof is increased higher and higher.

SUMMARY OF THE INVENTION

In view of the foregoing, an object of the present invention is to provide a head tracking system which can produce an accurate error signal for a read/write head of a disk drive and can position the magnetic head in a high-speed so as to meet the increased recording density and a high-speed read/write operation.

The present invention provides a head tracking system comprising a servo signal generator for generating an analog position error signal representing deviation of a position of a read/write head from the center of a present track over which the read/write head resides, a low-pass filter, having a cut-off frequency, for passing the analog position error signal, an A/D converter for converting the output of the low-pass filter to generate a digital position error signal at any sampling time occurring based on a sampling frequency, a signal processor for generating a total error signal based on the digital position error signal and a distance between the present track and a target track to be accessed by the read/write head, an actuator for moving the read/write head to the target track based on the total error signal.

BRIEF DESCRIPTION OF THE DRAWINGS

Other and further objects, features and advantages of the present invention will be more apparent from the following description, referring to the accompanying drawings in which.

DESCRIPTION OF THE PREFERRED EMBODIMENTS

Figure 1:
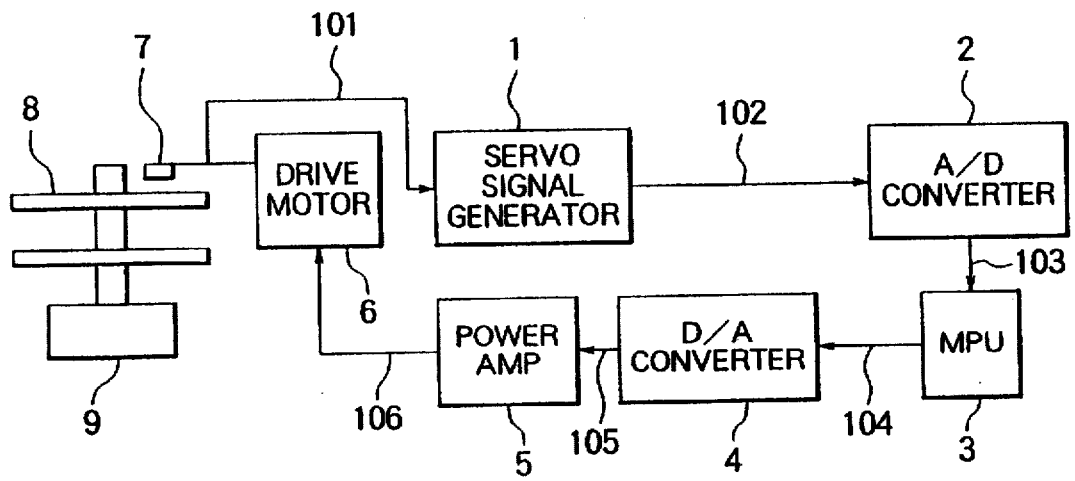
FIG. 1 is a block diagram of a disk drive including a conventional head tracking system.
Figure 2:
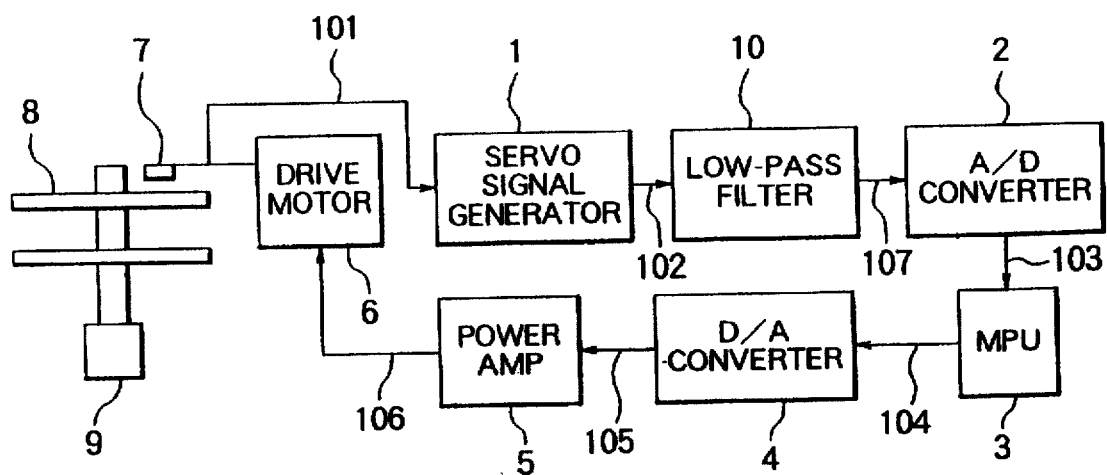
FIG. 2 is a block diagram of a disk drive including a head tracking system according to a first embodiment of the present invention.

Referring to FIG. 2, a head tracking system according to a first embodiment of the present invention includes a servo signal generator 1, a low-pass filter 10, an A/D converter 2, an MPU 3, a D/A converter 4, a power amplifier 5 and a drive motor 6. The head tracking system receives a tracking signal 101 from a magnetic read/write held 7 and moves the same over a recording disk file 8 mounted on a spindle motor 9. Both the. A/D converter 2 and D/A converter 4 are controlled by the same sampling frequency when the former receives the output 107 of the low-pass filter 10 and the latter outputs the analog total error signal 105. The low-pass filter 10 has a function for passing a signal 107 having signal components of a frequency lower than one-half the sampling frequency for the A/D converter 2 and D/A converter 4.

After the magnetic head 7 reads out a tracking signal 101 from the servo information recorded on the recording disk file 8, the servo signal generator 1 generates an analog servo signal or position error signal based on the tracking signal 101 for the magnetic head. The servo signal 102 represents deviation of the present radial position of the magnetic head 7 from the center of the present track of the disk file 8 over which the magnetic head resides. The analog servo signal 102 is then supplied to the low-pass filter 10, which eliminates the signal components having frequencies higher than one-half the sampling frequency and deteriorating the servo signal in the term of S/N. The low-pass filter 10 supplies the output 107 thereof to the A/D converter 2, which generates a digital servo signal 103 by sampling the output 107 of the low-pass filter 10 at any sampling time.

The digital servo signal 108 is supplied to the MPU 3, which calculates a digital total error signal based on the deviation of the radial position of the magnetic head 7 from the center of the present track and a radial distance between the present track and the target track to be accessed by the magnetic head 7.

The D/A converter 4 converts the digital total error signal 104 into an analog total error signal 105 and supplies the same to the power amplifier 5, which supplies a driving current 106 to the drive motor 6, thereby forming a feedback loop to move the magnetic head 7 to the center of the target track. The sampling frequency is, for example, 20 kHz, and the cut-off frequency of the low-pass filter 10 is 10 kHz accordingly.

In the first embodiment, the MPU 3 can calculates the total error signal based on the output of the A/D converter 2 which does not includes a frequency of noise component higher than one-half the sampling frequency, thereby enabling the MPU 8 to obtain an accurate total error signal 104 for accurate positioning of the magnetic head. In the first embodiment, however, an accurate signal cannot be obtained if the position error signal is below one-half the sampling frequency.

Figure 3:
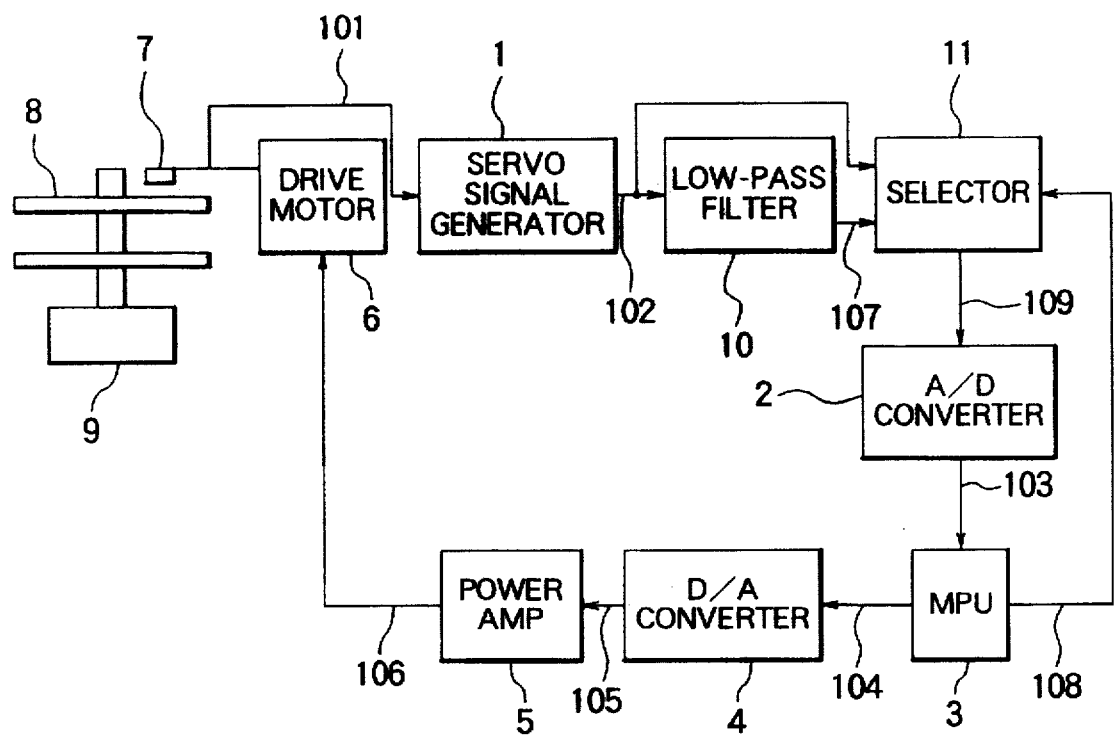
FIG. 3 is a block diagram of a disk drive including a head tracking system according to a second embodiment of the present invention.

Referring to FIG. 3, a head tracking system according to a second embodiment of the present invention includes a servo signal generator 1, a low-pass filter 10, a selector 11, an A/D converter 2, an MPU 3, a D/A converter 4, a power amplifier 5 and a drive motor 6. The head tracking system receives a tracking signal 101 from a magnetic head 7 and moves the same over a recording disk file 8 mounted on a spindle motor 9.

The low-pass filter 10 has a function for passing a signal 107 including signal components of a frequency lower than one-half the sampling frequency for the A/D converter 2 and D/A converter 4. The selector 11 selects either one of the outputs of the servo signal generator 1 and the low-pass filter 10 as the input 109 of the A/D converter 2.

In general, the servo signal or position error signal 102 changes its amplitude in a triangle waveform or a sinusoidal waveform during head seeking, with the frequency thereof being proportional to the seek speed of the magnetic head. For example, when the sampling frequency is 20 kHz, it is preferable in general that the cut-off frequency of the low-pass filter 10 is below 10 kHz in the view point of noise. In this case, however, if the track pitch of the disk file 8 and the seek speed of the magnetic head 7 are 10 μm and 2 m/s, respectively, the position error signal has a frequency as high as 50 kHz.

The low-pass filter having a cut-off frequency below 10 kHz cannot provide an output signal enabling the MPU 3 to obtain therefrom the position error signal. In the present embodiment, the selector 11 is provided for change-over of the outputs of the servo signal generator 1 and the low-pass filter 10, depending on the seek speed of the magnetic head 7. In detail, the MPU 3 provides a change-over control signal 108 to the selector 11, which selects the output 107 of the low-pass filter 10 when the frequency of the servo signal 102 is well below 10 kHz, for example, 5 kHz, while selects the output 102 of the servo signal generator 1 when the frequency of the servo signal 102 is in the vicinity of or more than 5 kHz.

By the configuration as described above, the second embodiment enables an accurate positioning of the magnetic head by selecting the output 107 of the low-pass filter 10 based on a low frequency of the output 102 of the servo signal generator 1 during a low speed seeking period or following period of the magnetic head located in the vicinity of the target track, while enables a high-speed seeking for the magnetic head located far from the target track based on the output 102 of the servo signal generator 1. When a speed profile of the magnetic head is selected in the disk drive based on the distance between the present track and the target track, as usual, the selection of the output 102 or 107 by the selector 11 may be based on the distance itself.

Figure 4:
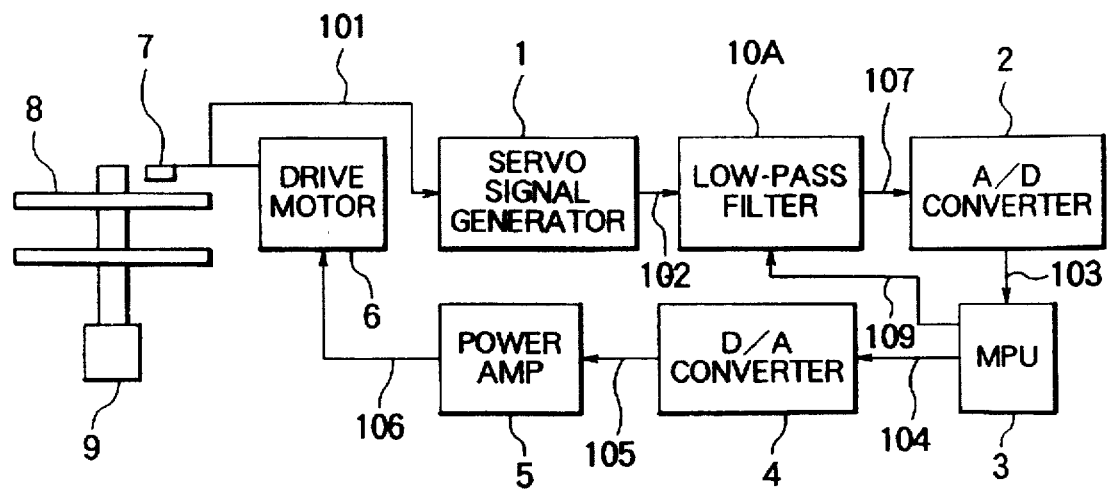
FIG. 4 is a block diagram of a disk drive including a head tracking system according to a third embodiment of the present invention.

Referring to FIG. 4, a head tracking system according to a third embodiment of the present invention includes a servo signal generator 1, a low-pass filter 10A, an A/D converter 2, an MPU 3, a D/A converter 4, a power amplifier 5 and a drive motor 6. In the present embodiment, The MPU 3 outputs a cut-off frequency control signal 109 to the low-pass filter 10A, the cut-off frequency control signal 109 being generated based on the distance between the present track and the target track or based on the seek speed of the magnetic head. The cut-off frequency control signal 109 controls the cut-off frequency of the low-pass filter 10A, thereby enabling detection of the position error signal in a high-speed period of the magnetic head, while enabling an accurate positioning of the magnetic head during a low-speed period of the magnetic head 7 located in the vicinity of the target track.

As described above, the present invention provides an accurate positioning of the read/write head while enabling a high-speed seeking. The read/write head may be any type of head such as magnetic head, optical head or magneto-optical head.

Since above embodiments are described only for examples, the present invention is not limited to such embodiments and it will be obvious for those skilled in the art that various modifications or alterations can be easily made based on the above embodiments within the scope of the present invention.

What is claimed is:

1. A head tracking system comprising a servo signal generator for generating an analog position error signal representing deviation of a position of a read/write head from the center of a present track over which the read/write head resides, a low-pass filter, having a cut-of frequency, for passing said analog position error signal, an A/D converter for converting the output of said low-pass filter to generate a digital position error signal at any sampling time occurring based on a sampling frequency, a signal processor for generating a total error signal based on said digital position error signal and a distance between said present track and a target track to be accessed by the read/write head, an actuator for moving the read/write head to the target track based on said total error signal, wherein said cut-off frequency is not more than one-half said sampling frequency.

2. A head tracking system as defined in claim 1 further comprising a selector for selecting one of the outputs of said servo signal generator and said low-pass filter as the input of said A/D converter based on the frequency of said analog position error signal.

3. A head tracking system as defined in claim 2 wherein said selector selects the output of said servo generator when the frequency of said analog position error signal is higher than a first frequency while selects the output of said low-pass filter when the frequency of said analog position error signal is lower than said first frequency.

4. A head tracking system as defined in claim 2 wherein said selector selects the output of said servo generator when the distance between said present track and said target track is larger than a first distance while selects the output of said low-pass filter when the distance between said present track and said target track is smaller than said first distance.

5. A head tracking system as defined in claim 1 wherein said cut-off frequency is controlled based on the speed of the read/write head.

6. A head tracking system as defined in claim 1 wherein said cut-off frequency is controlled based on the distance between said present track and said target track.

7. A head tracking system as defined in claim 1 further comprising a D/A converter controlled by said sampling frequency.

* * * * *